(12) United States Patent
Haustein et al.

(10) Patent No.: US 9,009,443 B2
(45) Date of Patent: Apr. 14, 2015

(54) SYSTEM AND METHOD FOR OPTIMIZED RECLAMATION PROCESSING IN A VIRTUAL TAPE LIBRARY SYSTEM

(75) Inventors: Nils Haustein, Mainz (DE); Stefan Neff, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 13/512,276

(22) PCT Filed: Aug. 30, 2010

(86) PCT No.: PCT/EP2010/062610
§ 371 (c)(1),
(2), (4) Date: May 25, 2012

(87) PCT Pub. No.: WO2011/064003
PCT Pub. Date: Jun. 3, 2011

(65) Prior Publication Data
US 2012/0265954 A1    Oct. 18, 2012

(30) Foreign Application Priority Data

Nov. 27, 2009 (EP) .................................... 09177283

(51) Int. Cl.
*G06F 9/26* (2006.01)
*G06F 9/34* (2006.01)
(Continued)

(52) U.S. Cl.
CPC .............. *G06F 3/0664* (2013.01); *G06F 3/061* (2013.01); *G06F 3/0629* (2013.01); *G06F 3/067* (2013.01); *G06F 3/0686* (2013.01); *G06F 3/0689* (2013.01)

(58) Field of Classification Search
CPC ..................................................... G06F 3/0664
See application file for complete search history.

(56) References Cited

U.S. PATENT DOCUMENTS

| 6,789,161 | B1 | 9/2004 | Blendermann et al. |
| 7,020,755 | B2 | 3/2006 | Gibble et al. |

(Continued)

FOREIGN PATENT DOCUMENTS

| CN | 1487419 | 4/2004 |
| EP | 1686451 | 8/2006 |
| WO | 2008116751 | 10/2008 |

OTHER PUBLICATIONS

Chinese Office Action dated May 4, 2014, pp. 6, for Application 201080052602.1, filed Aug. 30, 2010.

(Continued)

*Primary Examiner* — Eric S Cardwell
(74) *Attorney, Agent, or Firm* — Janaki K. Davda; Konrad Raynes Davda & Victor LLP

(57) ABSTRACT

A storage management application determines that a source virtual tape requires reclamation, identifies all block addresses for active data of a source virtual tape and sorts the block addresses in an ascending order, identifies a target virtual tape which has sufficient free capacity to store the active data of said source virtual tape and the last written block address on said target virtual tape, and sends a command to the VTL-system instructing it to perform reclamation including information about said source and said target virtual tape, the sorted list of block addresses denoting active data on the source virtual tape and the starting block address on the target virtual tape. The reclamation logic references the active data host blocks of said source volume to said target virtual tape starting at said starting block address by just updating the host block to disk block mapping table.

20 Claims, 7 Drawing Sheets

Figure 7:
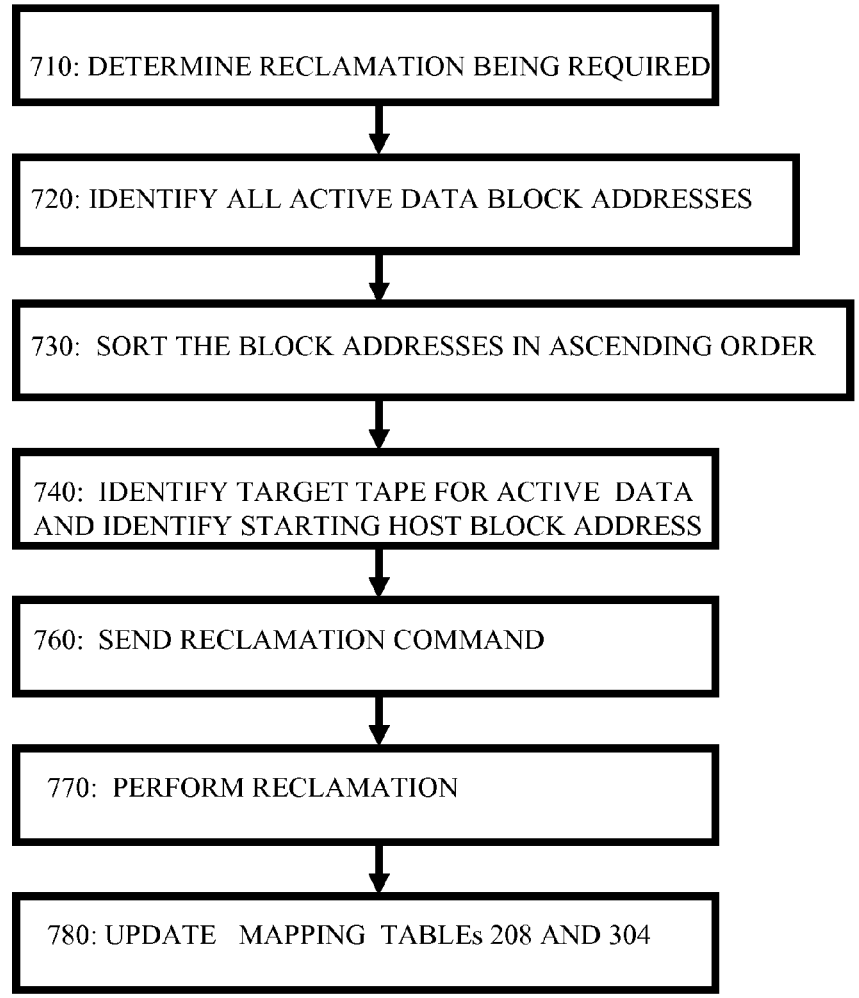

(51) Int. Cl.
   *G06F 13/00* (2006.01)
   *G06F 13/28* (2006.01)
   *G06F 3/06* (2006.01)

(56) References Cited

U.S. PATENT DOCUMENTS

| | | |
|---|---|---|
| 7,103,731 B2 | 9/2006 | Gibble et al. |
| 7,979,664 B2 | 7/2011 | Carlson et al. |
| 2004/0044862 A1 | 3/2004 | Carlson et al. |
| 2008/0243860 A1* | 10/2008 | Cannon et al. .......... 707/10 |

OTHER PUBLICATIONS

Information Materials for IDS, pp. 4, for Chinese Office Action dated May 4, 2014, pp. 6, for Application 201080052602.1, filed Aug. 30, 2010.
US Patent 7979664 English counterpart for CN1487419.
PCT International Search Report & Written Opinion dated Oct. 6, 2010 for Application No. PCT/EP2010/062610 filed Aug. 30, 2010, 11 pp.

* cited by examiner

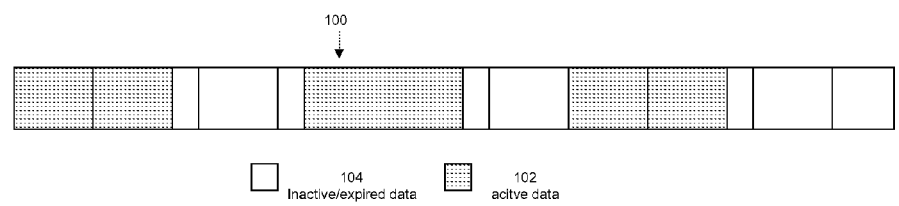
PRIOR ART  FIG. 1
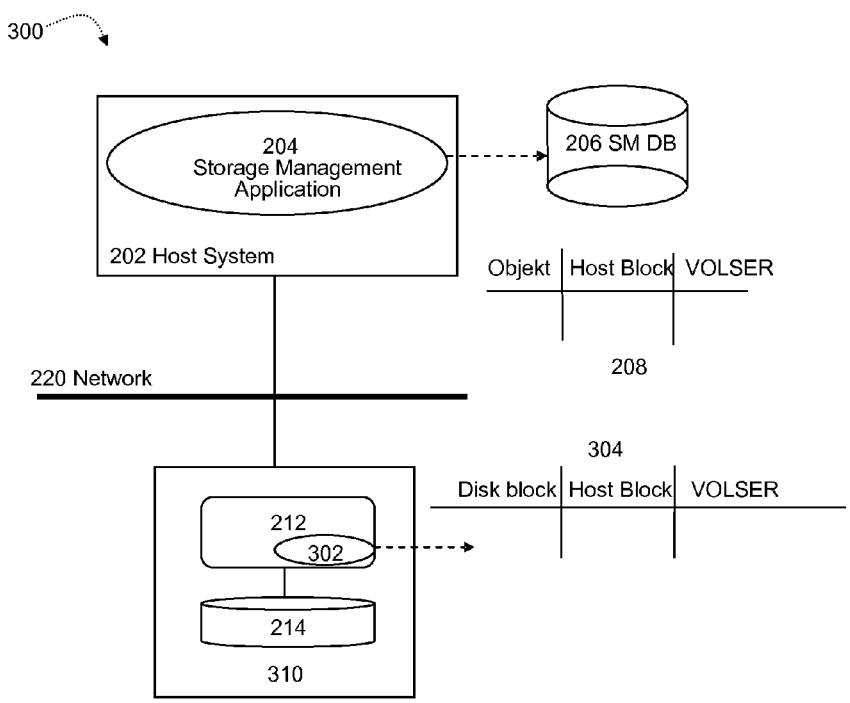
FIG. 2

| Disk Block | Host Block | VOLSER |
|---|---|---|
| 0 | 0 | 123456 |
| 1 | 1 | 123456 |
| 2 | 2 | 123456 |
| . | | |
| 228 | 0 | 654321 |
| 229 | 1 | 654321 |

Table 1: Example for table 304 with Block mapping table before reclamation

FIG. 3

| Disk Block | Host Block | VOLSER |
|---|---|---|
| 0 | 0, 2 | 123456, 654321 |
| 1 | 1 | 123456, |
| 2 | 2, 3 | 123456, 654321 |
| . | | |
| 228 | 0 | 654321 |
| 229 | 1 | 654321 |

Table 2: Example for table 304 with Block mapping table based on table 1 after reclamation

FIG. 4

| Disk Block | Host Block | VOLSER |
|---|---|---|
| 0 | 2 | 654321 |
| 1 | | |
| 2 | 3 | 654321 |
| . | | |
| 228 | 0 | 654321 |
| 229 | 1 | 654321 |

Table 3: Example for table 304 with Block mapping table based on table 2 after deleting tape 123456

FIG. 5

| Disk Block | Host Block | VOLSER |
|---|---|---|
| 0 | 2 | 654321 |
| 1 | | |
| 2 | | |
| . | | |
| 228 | 0 | 654321 |
| 229 | | |

Table 4: Example for table 304 with Block mapping table based on table 3 after deleted inactive data for tape 654321

FIG. 6

SCSI Mode Select command according to prior art

Mode Page 25h: active data block list

600

| Byte | Bit | | | | | | | |
|---|---|---|---|---|---|---|---|---|
| | 7 | 6 | 5 | 4 | 3 | 2 | 1 | 0 |
| 0 | PS=1 | RSVD | Page Code = 25h | | | | | |
| 1 | Page Length = (22 + 2*N) h | | | | | | | |
| 3 | (MSB) Source Volser | | | | | | | |
| 13 | (LSB) | | | | | | | |
| 14 | (MSB) Target Volser | | | | | | | |
| 24 | (LSB) | | | | | | | |
| 25 | (MSB) Starting Block address | | | | | | | |
| 26 | (LSB) | | | | | | | |
| 27 | (MSB) Active Data Block address 1 | | | | | | | |
| 28 | (LSB) | | | | | | | |
| 29 | (MSB) Active Data Block address 2 | | | | | | | |
| 30 | (LSB) | | | | | | | |
| 27 + 2N | (MSB) Active Data Block Address N | | | | | | | |
| 27 + 2N+1 | (LSB | | | | | | | |

- 602
- 604
- 606
- 608
- 610
- 612
- 614
- 618

Mode page 25h representing reclamation command

Figure 8B

Mode Page 26h: inactive data block list

800

| Byte | Bit | | | | | | | |
|---|---|---|---|---|---|---|---|---|
| | 7 | 6 | 5 | 4 | 3 | 2 | 1 | 0 |
| 0 | PS=1 | RSVD | Page Code = 26h | | | | | |
| 1 | Page Length = (10 + 2*N) h | | | | | | | |
| 3 | (MSB)    Source Volser | | | | | | | |
| 13 | (LSB) | | | | | | | |
| 14 | (MSB) Inactive Data Block address 1 | | | | | | | |
| 15 | (LSB) | | | | | | | |
| 16 | (MSB) Inactive Data Block address 2 | | | | | | | |
| 17 | (LSB) | | | | | | | |
| 14 + 2N | (MSB)    Inactive Data Block Address N | | | | | | | |
| 14 + 2N+1 | (LSB | | | | | | | |

802 — Page Code = 26h row
804 — Page Length
806 — Source Volser
808 — Inactive Data Block address 1
810 — Inactive Data Block address 2
812 — Inactive Data Block Address N Mode page representing inactive data block processing

FIG. 8C

SYSTEM AND METHOD FOR OPTIMIZED RECLAMATION PROCESSING IN A VIRTUAL TAPE LIBRARY SYSTEM

1. BACKGROUND OF THE INVENTION

1.1. Field of the Invention

The present invention relates to the field of storage management of sequential media and more particular it relates to autonomous reclamation processing of virtualized sequential media such as virtual tapes in a virtual tape library.

1.2. Description and Disadvantages of Prior Art

Storage management applications such as IBM Tivoli Storage Manager, Symantec NetBackup or EMC Legato Networker perform different data storage operations such as backup, archiving and hierarchical storage management. (IBM and Tivoli are trademarks or registered trademarks of International Business Machines Corporation and/or its affiliates in the United States, other countries, or both. Symantec and NetBackup are trademarks or registered trademarks of Symantec Corporation and/or its affiliates in the United States, other countries, or both. EMC, Legato, and Networker are trademarks or registered trademarks of EMC Corporation and/or its affiliates in the United States, other countries, or both.) Storage management applications use sequential media such as virtual tape for cost efficient storage mainly for data which is accessed more often than data on physical tape.

Virtual tapes are typically emulated by a virtual tape library. A virtual tape library according to prior art comprises a computing system executing a tape virtualization software. This tape virtualization software emulates virtual tape drives, virtual tape libraries and virtual tapes. A virtual tape library is connected via an interface and a network—such as a Storage Area Network (SAN) or Local Area Network (LAN)—to the storage management application. The storage management application "sees" the virtual tape devices and virtual tapes just a real tape devices. When the storage management application writes a virtual tape than this virtual tape is stored on a disk system also comprised in the virtual tape library. Each virtual tape in a virtual tape library has a unique serial number which is also called VOLSER. The VOLSER allows the unique identification of a virtual tape in a virtual tape library.

A virtual tape—just like a real tape—cannot be written in a random fashion but rather sequentially from the beginning to the end. Thus it is not possible to write data to any position on tape but only at the position and beyond where the last write operation has ended. When data on a tape needs to be overwritten then the tape must be written again starting from the beginning.

Over time the data which has been written to a virtual tape expires which causes data or parts of the data to become inactive. The remaining data is still active. FIG. 1 shows and example for active 102 and inactive data 104 on virtual tape 100.

Active data is the data which is still valid and might be used for restores. Inactive data has typically expired and is not valid any more. Thus inactive data is essentially represented by the entire tape capacity minus the active data. Inactive data is a waste of storage space in the disk system of the VTL because this data is not longer needed and could potentially be deleted.

As more data becomes inactive over time on a virtual tape as more storage capacity is wasted on virtual tape because the spots with inactive data 104 cannot be overwritten selectively. In addition, the data on tape typically does not expire in a sequential order leaving gaps with inactive data between active data portions on tape as shown in FIG. 1.

For example a virtual tape according to prior art such as IBM TS1130 emulated in a Virtual Tape Library IBM TS7500 has a capacity of 1 TB. If such virtual tape has 50% active data left then 500 GB of storage capacity is wasted—because its still allocated by the virtual tape library, but not referenced anymore by the application software. A virtual tape can only be reused when all active data has expired or when all active data has been moved to another virtual tape. The virtual tape needs to be empty to be re-used for new backups from the beginning.

Moving the active data 102 to another virtual tape is also called reclamation. Storage management applications implement the reclamation process. The reclamation process monitors the amount of active data on each virtual tape which has been written full. Typically there is a threshold the user can set—also called the reclamation threshold—and if the amount of active data falls below that threshold the storage management software automatically copies the remaining active data from that source virtual tape to a target virtual tape which is in a empty or filling status at the moment of time. At the end of the reclamation process the source tape is empty and can be re-used from the beginning of tape.

This reclamation process according to prior art has the following disadvantages:

1. The reclamation process is executed by the storage management server which consumes additional computing resources on the storage management server.

2. The reclamation process requires two virtual devices: one to read the data from and one to write the data to.

3. During reclamation the network between the storage management server and the virtual tape device is utilized.

4. Data sets or files which might belong together might be written to two distinct virtual tapes during reclamation in case one output virtual tape gets full. This causes longer restore times.

5. In order to keep the impact of the above two reasons low the recommendation is typically to start the reclamation process when 30% or less active data resides on a sequential medium. This however causes a massive decrease in usable storage capacity—theoretically 70% in practice usually 50%.

6. Virtual tapes which after reclamation contain no active data still consume the entire capacity (inactive data) after reclamation processing, because the space is only released when a reclaimed virtual tape is rewritten from the beginning of tape (host block 0) by the application software.

Thus a system and method is needed which overcomes these disadvantages of reclamation processing according to prior art.

1.3. Objectives of the Invention

The objective of the present invention is to provide an improved method and system for managing virtual tapes in a virtual tape library system.

2. SUMMARY AND ADVANTAGES OF THE INVENTION

This objective of the invention is achieved by the features stated in enclosed independent claims. Further advantageous arrangements and embodiments of the invention are set forth in the respective subclaims. Reference should now be made to the appended claims.

According to a first aspect of the present invention the inventional system comprises a storage management application managing virtual tapes in a virtual tape library system (VTL-system) which is capable to identify all block addresses of active data for a given source virtual tape; said storage management application is connected via a network to said virtual tape library system and is capable to send a command instructing said VTL-system to perform autonomous reclamation.

The VTL-system is characterized by an inventional reclamation logic which uniquely maps each host block written by the storage management application to a block on the disk system of said VTL-system. In conjunction with the storage management application it performs a method to perform autonomous reclamation which is characterized by the steps of:

a) the storage management application determines that a source virtual tape requires reclamation, b) the storage management application identifies all block addresses for active data of a source virtual tape and sorts the block addresses in an ascending order, c) the storage management application identifies a target virtual tape which has sufficient free capacity to store the active data of said source virtual tape and the last written block address on said target virtual tape, d) the storage management sends a command to the VTL-system instructing it to perform reclamation including information about said source and said target virtual tape, the sorted list of block addresses denoting active data on the source virtual tape and the starting block address on the target virtual tape, e) upon reception of the command said reclamation logic references the active data host blocks of said source volume to said target virtual tape starting at said starting block address by just updating the host block to disk block mapping table and sends a completion message to the storage management application for the reclamation command; and f) upon reception of the completion message for the reclamation command the storage management application updates the block mapping table by removing said active data blocks of the source volumes and adding said active data blocks to the target volume starting at the starting host block address.

In an optional next step the reclamation logic removes all host block addresses for the source virtual tape from the host block to disk block mapping table in order to free up space in the VTL-system. Because the storage space of source virtual tape has been reclaimed and the data previously stored on said source virtual tape is not longer needed.

In one embodiment of the present invention the host block-to-disk block-mapping is done via a mapping table. A disk block might be represented by a block on the disk system. Alternatively it might be represented by a file in a file system.

The inventional reclamation logic includes a further method which intercepts write commands and updates the host block to disk block mapping table in accordance to the write command.

The inventional reclamation logic further includes a method which intercepts read commands and determines the appropriate disk block based on said mapping table.

The present invention further provides a second aspect in which said reclamation logic in conjunction with the storage management application comprises a further method which deletes inactive data for a given source virtual volume from the VTL disk system by the following steps:

1. the storage management application determines that a source virtual tape has a certain percentage of inactive data by comparing the relative amount of inactive data to a threshold 2. the storage management application identifies all block addresses for inactive data of a source virtual tape 3. the storage management sends a command to the VTL-system instructing it to delete the inactive data blocks of the source virtual volume identified above 4. upon reception of the command the inventional reclamation logic deletes the inactive data blocks by removing these from the host block to disk block mapping table. This will free up the disk blocks which can now be used for new data.

The inventional methods and respective systems overcome the above mentioned disadvantages of prior art storage management applications in conjunction with prior art VTL systems by means of the following features:

1. Reclamation is not executed by the storage management server but by the VTL-system itself. This saves performance of the storage management application.

2. No mount of virtual tapes is necessary to perform reclamation.

3. The storage network between the storage management server and the virtual tape drive is not utilized for reclamation processing because the reclamation process does not move any data.

4. All data sets or files which represent active data will remain on the same target virtual tape which optimizes the restore performance and saves virtual tape drive resources.

5. Reclamation processing can be performed at any time because it minimizes the impact to the storage management server and the network.

6. Storage capacity is managed efficiently because active data blocks from the source virtual tape are not copied but referenced to the target virtual tape, and because inactive data blocks are deleted.

Thus, in other words, the present invention provides efficient space management in a virtual tape library by referencing active data blocks without moving any data and deleting inactive, expired data blocks.

Thereby the prior art tape access (read, write, locate) remains unchanged with this invention and does not require adjustment at the storage management application. The implementation of the inventional reclamation can be implemented with prior art SCSI commands such as the SCSI mode select command.

3. BRIEF DESCRIPTION OF THE DRAWINGS

Figure 8A:
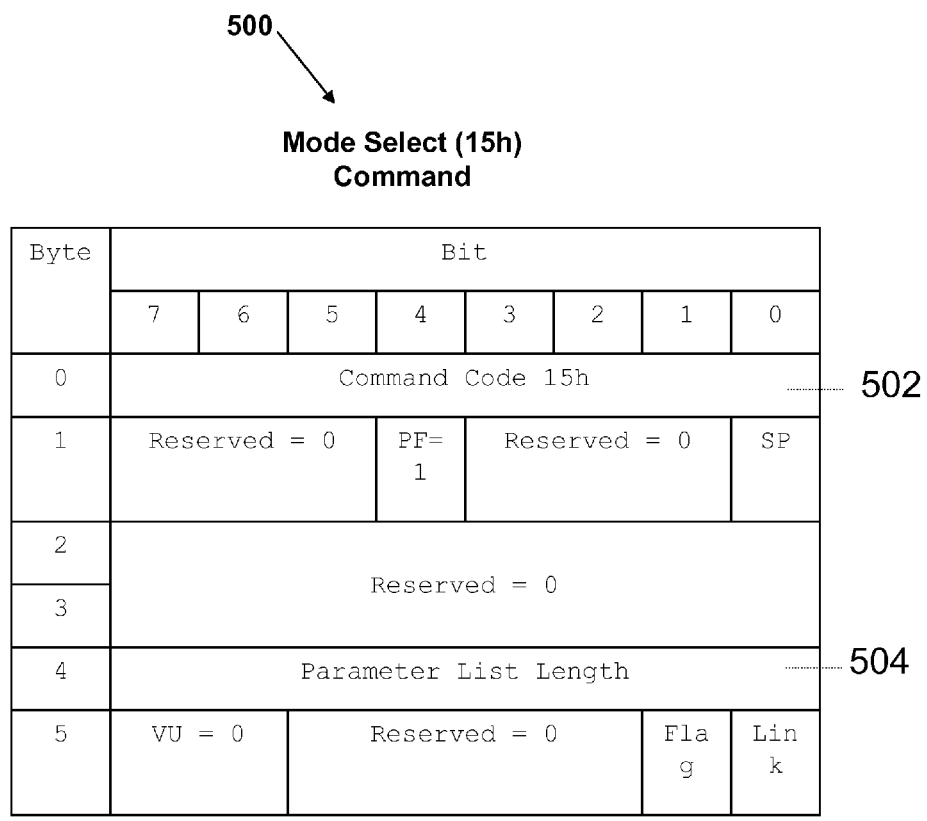

The present invention is illustrated by way of example and is not limited by the shape of the figures of the drawings in which:

FIG. 1 illustrates an example for active and inactive data on a tape,

FIG. 2 illustrates the most basic structural components of an inventional hardware and software environment used for a preferred embodiment of the inventional method, FIGS. 3, 4, 5 and 6 illustrate examples for table 304 with block mapping tables updating during the inventional reclamation processing, FIG. 7 illustrates the control flow of the most important steps of a preferred embodiment of the inventional method, FIG. 8A illustrates a MODE SELECT command according the SCSI T10 standard, FIG. 8B illustrates a mode page 25h sent in accordance to the MODE SELECT command and used to instruct the VTL to perform reclamation according to a preferred embodiment of the inventional method, FIG. 8C illustrates a mode page 26h sent in accordance to the MODE SELECT command and used to instruct the VTL to delete inactive data according to a preferred embodiment of the inventional method.

4. DETAILED DESCRIPTION OF THE PREFERRED EMBODIMENT

With general reference to the figures and with special reference now to FIG. 2 an inventional embodiment of a tape management system 300 comprises a storage management application 204 running on a host computing system 202. The Storage management system manages virtual tapes included in a virtual tape library (VTL) 310. For each virtual tape which has data written on it, the storage management system 204 maintains a table 208 which maps the object such as files (column 1) to host block addresses (column 2) on said virtual tape (column 3) denoted by a VOLSER—which uniquely identifies each virtual tape in a VTL—this is according to prior art.

The Storage management system 204 is connected to the virtual tape library system 310 via a network 220 which might be a storage area network (SAN) based on fibre channel or a local area network (LAN) based on Ethernet or the like. The Virtual tape library system 310 includes a computing system 212 running the virtualization program and a disk system 214 which is used to store the data of virtual tapes. The inventional virtual tape library system further includes inventional a reclamation logic 302 which manages the table 304.

In table 304 the inventional reclamation logic uniquely maps the host blocks (column 2) of each virtual tape (column 3) denoted by a VOLSER to a disk block (column 1) of the disk system 214. A disk block might be a block on the disk device comprised in the VTL-system, or it might be represented by a file system according to prior art which stores the data on the disk system of the VTL-System 310. A host block is a block written by the storage management application 204 to the virtual tape.

As shown in table 1 of FIG. 3 (second row) the disk block 0 (column 1) contains data of host block 0 (column 2) which pertains to virtual tape with VOLSER 123456 (column 3). Accordingly, disk block 1 (third row) contains data of host block 1 for virtual tape 123456. Disk block 3 (fourth row) contains data of host block 3 for virtual tape 123456. Row five denotes a continuation of the host-block to disk-block mapping for VOLSER 123456 or other volser until disk block 227. Disk block 228(sixth row) contains data of host block 0 pertaining to another virtual tape with the VOLSER 654321. Accordingly, disk block 229(seventh row) contains data of host block 1 for virtual tape 654321, and so on.

Next, and with additional reference to FIG. 7 the inventional reclamation processing of active data will be described in more detail by means of a preferred embodiment of the inventional method. FIG. 7 illustrates the control flow of the most important steps thereof.

In a first step 710, the storage management application 204 determines the necessity that a reclamation procedure is required for a source virtual tape tape denoted by a VOLSER. This can be based on comparisons with a user defined reclamation threshold according to prior art.

In a step 720, the storage management application 204 identifies all host blocks for said source virtual which contain active data and sorts this list in a ascending order, step 730. It thereby uses table 208 which maps all objects (files) stored on said source virtual tape to the host blocks where the actual object related data is stored on said source virtual tape. Thus table 208 which is stored in the repository 206 of the storage management application includes all active data blocks for said source virtual tape.

In step 740 the storage management application 204 identifies a target virtual tape denoted by a VOLSER and a starting block address where the active data is to be written to. The starting block address for said target virtual tape is derived from table 208 and is identical to the host block address where the last data has been written incremented by one.

In step 760 the storage management application sends a reclamation command including this list of active data host blocks, the VOLSER of the source and target virtual tape and the starting host block address on the target virtual tape to the reclamation logic 302 of the virtual tape system 310 via network 220. The reclamation command can be a MODE SELECT command followed by a customized mode page according to the prior art SCSI T10 standard. Said SCSI mode select command is explained later using FIGS. 8A and 8B.

Responsive to the reception of this reclamation command the reclamation logic 302 performs reclamation in a step 770 by mapping the host blocks with active data of the source virtual tape to the host blocks of the target virtual tape starting at the starting host block address in table 304.

In step 780 table 304 is updated according to the reclamation processing in procedure 770 and table 208 is updated according to the reclamation command whereby the active data host blocks of the source virtual tape are assigned to the target virtual tape.

This reclamation procedure 770 itself which is performed by the reclamation logic 302 comprises the steps of:
1. receiving the mode select command 500 (FIG. 8A) and identifying it as a reclamation command based on the mode page 600 (FIG. 8B), step 770.
2. determining from said command the source and the target virtual tape and verifying that these tapes exist in the virtual tape library.
3. determining from said command the list of active data host blocks pertaining to the source virtual tape and verifying that these blocks exist in table 304 (second and third column).
4. determining from said command the starting host block address of the target virtual tape and verifying that the starting block address is not beyond end of data at the target virtual tape using table 304 second and third column. It should be noted in this context that the end of data is identified by the host block address which has been written last to the target virtual tape.
5. referencing the active data blocks of the source virtual tape to the target virtual tape in a sequential order starting at the starting block address of the target virtual tape by updating table 304.
6. Optionally delete all host blocks of the source virtual tape from table 304 column 2 and 3.
7. completing the command with an appropriate completion message.

Upon receiving the completion message the storage management application 204 updates table 208 by assigning all active data host block addresses (column 2 of table 208) included in the reclamation command sent in step 760 to the target virtual tape (column 3 of table 208) starting at the starting host block address and removing all active data host block addresses for the source virtual volume from table 208.

For examplep—according to FIG. 3, table 1—the storage management application determines that the source virtual tape with VOLSER 123456 requires reclamation. The active data host blocks are blocks 0 and 2. The storage management application further identifies that target virtual tape 654321 has two blocks (0 and 1) indicating that block 2 as the starting address. The storage management application sends the mode select command (500 in FIG. 8A) followed by a mode page 600 of FIG. 8B to the inventional VTL-System including the following mode page parameters:

Source volser: 123456 (606 in FIG. 8B)
active data blocks: 0,2 (612 and 614 in FIG. 8B)
Target volser: 654321 (608 in FIG. 8B)
Target start block address: 2 (610 in FIG. 8B)

The inventional method explained above updates table 1 resulting in table 2 depicted in FIG. 4.

In table 2 (second and fourth row) the active data host blocks 0 and 2 of source virtual tape 123456 residing on disk block 0 and 2 are additionally mapped to host blocks 2 and 3 of virtual tape 654321 because the starting address for virtual 654321 is 2. Thus disk blocks 0 and 2 are shared by virtual tapes with VOLSER 123456 and 654321.

In an optional step followed after step 780 all host block addresses for the source virtual tape 123456 are deleted from table 304 by the reclamation logic. The result of this operation is shown in table 3 of FIG. 5. The second, third and fourth row of column 2 in table 3 are updated by removing the host blocks for VOLSER 123456 resulting in disk block 1 to become free and usable for new data.

Next, the general read and write processing will be described in more detail:

The inventional VTL-System 310 implements a method where every time a virtual tape is written by the storage management application, the table 304 is updated with the mapping of the written host blocks to the disk block where the data is stored. Thereby the write command is not changed and thus corresponds to prior art, for example a SCSI write command. The inventional VTL-system 310 and in particular the inventional reclamation logic 302 intercepts the respective write command, updates table 304 and then executes the write command. A write command is always directed to a particular virtual tape. The write command is executed at the position where the virtual tape has been positioned. The inventional method comprises the following steps:

1. receive the write command,
2. identify the current position and translate it to a starting host block address,
3. identify the virtual tape serial number,
4. identify a starting disk block address which is not used (column 2 and 3 are empty in table 304),
5. execute the write command by writing the data sequentially from the starting host blocks address to the corresponding disk block address starting at said starting disk block address,
6. identifying all host block addresses in table 304 which are equal or greater than said starting host block address (address at the current position determined before),
7. delete said identified host block addresses for the said virtual tape from table 304.

Steps 6 and 7 above ensure that when host blocks are overwritten they are eliminated from table 304. For example, when a virtual tape is written from the beginning (host block 0) then all previously written host blocks are void and will be deleted by steps 6 and 7.

The inventional VTL-System 310 implements a further method which processes read commands. When a read command is received—such as a SCSI read command according to prior art—the VTL-system determines the current position of the virtual tape subject for the read command, maps this current position to a starting host block, identifies the disk block which is mapped to said starting host block using table 304 column 1 and 2 and reads the data from said starting disk block in sequential order according to the number of blocks requested by the read command.

Inactive Data Processing:

Besides performing reclamation in a resource sparing mode this invention can be extended to delete inactive data pertaining to virtual tapes from the disk system of the virtual tape system. This helps to reduce the disk capacity being used by deleting the data which is not longer needed. The process for inactive data processing is described next below:

The storage management application 204 identifies all host blocks for a given virtual tape denoted by a VOLSER which contain inactive data. It thereby uses table 208 which maps all objects (e.g. files) stored on a given virtual tape to the blocks where the data pertaining to the object is stored on tape. Table 208 which is stored in the repository 206 of the storage management application includes all active data blocks for said virtual tape. The determination of the inactive data blocks is essentially conducted by subtracting the set of active data host blocks from all data host blocks pertaining to a given virtual tape.

The storage management application 204 sends a command such as the SCSI mode select command 500 in FIG. 8A followed by a mode page 800 (FIG. 8C) including the volser of the source virtual tape (806 in FIG. 8C) and a list of said identified inactive data host blocks (808-812 in FIG. 8C) pertaining to a source virtual volume to the inventional VTL-System 310.

Responsive to the reception of this command the reclamation logic 302 deletes the host blocks identified in this list of inactive data blocks from table 304 comprising the following steps:

1. receiving the mode select command 500 in FIG. 8A and mode page 800 (FIG. 8C) and identifying it as a command to delete inactive data blocks for a virtual tape based on the mode page code.
2. determining from said mode page 800 (FIG. 8C) the source virtual tape (806 in FIG. 8C) and verifying that this tape exists in the virtual tape library.
3. determining from said mode page 800 (FIG. 8C) the list of inactive data (808-812 in FIG. 8C) pertaining to the source virtual tape and verifying that these blocks exist in table 304 (second and third column)
4. deleting each block address identified by the said list from column 2 of table 304.
5. completing the command with an appropriate status.

For example, let's assume the virtual tape 654321 has inactive data at host blocks 1 and 3. The storage management application identifies this based on table 208 and sends a mode select command 500 (FIG. 8A) followed by mode page 800 (FIG. 8C) to the VTL system 310 including the VOLSER of tape 654321 and the list of inactive data blocks 1 and 3. Responsive to this the inventional reclamation logic removes these blocks from table 304 as illustrated in table 4 in FIG. 6.

In table 4 the fourth row is updated by removing the host block 3 (column 2) and VOLSER 654321 (column 3). The seventh row is updated by removing host block 1 (column 2) and VOLSER 654321 (column 3). Thus, disk blocks 2 and 229 are being freed up and can be used for new data.

The SCSI mode select command can be used by the storage management application 204 to instruct the virtual tape library to perform reclamation according to step 760 of FIG. 7. An example of such SCSI mode is shown in FIG. 8A.

The SCSI Mode Select command (500), is basically known from prior art. The mode select command allows the storage management application 204 sending a mode page to the virtual tape library 310. This command has a command code 502 of 15h, where the suffix h denotes hexadecimal or base 16. This command code instructs the virtual tape library that this is a mode select command. The parameter list length 504 specifies the size of the mode page 600 or 800 to be transferred in bytes. Subsequently to sending this command the storage management application will send the actual mode page 600 or 800.

The mode select command 500 is followed by a mode parameter header (prior art, not shown), a block descriptor (prior art, not shown) and one or more mode pages such as mode page 600 of FIG. 8B or 800 of FIG. 8C.

Mode page 600 of FIG. 8B is used by the storage management application to instruct the VTL system to perform reclamation. Mode page 600 has a page code (602) of 25h, where the suffix h denotes hexadecimal or base 16.

The field parameter page length (604) specifies the length of the mode page in bytes. In this example the length of the mode page is (22+2*N) bytes where N denotes the number of active data block addresses identified in step 720 of FIG. 7.

Field 606 specifies the source virtual denoted by a VOLSER being reclaimed which is determined in step 710 of FIG. 7.

Field 608 specifies the target virtual tape denoted by a VOLSER which is determined in step 740 of FIG. 7. Field 610 includes the starting host block address for the target virtual tape determined in step 740 of FIG. 7.

Fields 612, 614 and 618 include active data host block addresses 1, 2 and N of the source virtual tape which have been identified in step 720 of FIG. 7. N is the number of the last host block address determined in step 720.

Upon reception of the mode select command 500 followed by mode page 25h (600) the reclamation logic 302 performs reclamation as outline in step 770 of FIG. 7.

Mode page 800 of FIG. 8C is used by the storage management application to instruct the VTL system to delete inactive data. Mode page 800 has a page code (802) of 26h, where the suffix h denotes hexadecimal or base 16.

The field parameter page length (804) specifies the length of the mode page in bytes. In this example the length of the mode page is (10+2*N) bytes where N denotes the number of inactive data block addresses identified in step 720 of FIG. 7. Field 806 specifies the source virtual tape denoted by a VOLSER for which the inactive data blocks are to be deleted. Fields 808, 810 and 812 include inactive data host block addresses pertaining to the source virtual tape which should be deleted.

Upon reception of the mode select command 500 followed by mode page 26h (800) the reclamation logic 302 removes all inactive data block addresses (fields 808, 810 and 812 of mode page 26h in FIG. 8) from table 304 (column 2) according to source volume (field 806) (column 3 of table 304).

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A method for managing virtual tapes in a virtual tape library system, comprising:
   mapping, using a processor of a computer, each host block written by a storage management application to a respective disk block on a disk system of the virtual tape library system in a disk block to host block mapping table that identifies, for each disk block, a host block address and a source virtual tape identifier;
   determining that the source virtual tape requires reclamation;
   identifying block addresses for active data of the source virtual tape;
   identifying a target virtual tape that has capacity to store the active data of the source virtual tape;
   identifying a last written block address on the target virtual tape; and
   mapping the active data of the source virtual tape to the target virtual tape starting at the last written block address on the target virtual tape by updating the disk block to host block mapping table to replace, for each of the block addresses for active data, 1) the host block address on the source virtual tape with a host block address on the target virtual tape and 2) the source virtual tape identifier with a target virtual tape identifier.

2. The method of claim 1, further comprising:
   sorting the block addresses for the active data of the source virtual tape in an ascending order.

3. The method of claim 1, wherein mapping the active data further comprises:
   for the block addresses for the active data of the source virtual tape, updating the disk block to host block mapping table to add new block addresses of the target virtual tape.

4. The method of claim 1, further comprising:
   removing the block addresses for the active data of the source virtual tape from the disk block to host block mapping table to free up space in the virtual tape library system.

5. The method of claim 1, further comprising:
updating the disk block to host block mapping table by assigning the block addresses for the active data of the source virtual tape to new block addresses of the target virtual tape starting at the last written block address on the target virtual tape and deleting the block addresses for the active data for the source virtual tape.

6. The method of claim 1, further comprising:
identifying host blocks for inactive data of the source virtual tape; and
deleting the host blocks for the inactive data of the source virtual tape by:
verifying that the source virtual tape exists in the virtual tape library system;
verifying that the host blocks exist in the disk block to host block mapping table; and
deleting each block address for each of the host blocks in the disk block to host block mapping table.

7. The method of claim 1, wherein the disk block to host block mapping table has columns for a disk block address, the host block address, and the target virtual tape identifier.

8. The method of claim 1, further comprising:
storing the disk block to host block mapping table, wherein the block addresses, the target virtual tape, and the last written block address are identified using the disk block to host block mapping table.

9. The method of claim 1, wherein the storage management application sends a reclamation command including information about the source virtual tape, the target virtual tape, the active data of the source virtual tape, and the last written block address of the target virtual tape to the virtual tape library system, instructing the virtual tape library system to perform reclamation.

10. The method of claim 9, wherein the reclamation command comprises a SCSI mode select command with a mode page.

11. A computer program product for managing virtual tapes in a virtual tape library system, the computer program product comprising:
a non-transitory computer readable medium including computer readable program code that, when executed by a processor of a computer, is configured to perform:
mapping each host block written by a storage management application to a respective disk block on a disk system of the virtual tape library system in a disk block to host block mapping table that identifies, for each disk block, a host block address and a source virtual tape identifier;
determining that the source virtual tape requires reclamation;
identifying block addresses for active data of the source virtual tape;
identifying a target virtual tape that has capacity to store the active data of the source virtual tape;
identifying a last written block address on the target virtual tape; and
mapping the active data of the source virtual tape to the target virtual tape starting at the last written block address on the target virtual tape by updating the disk block to host block mapping table to replace, for each of the block addresses for active data, 1) the host block address on the source virtual tape with a host block address on the target virtual tape and 2) the source virtual tape identifier with a target virtual tape identifier.

12. The computer program product of claim 11, further comprising:
sorting the block addresses for the active data of the source virtual tape in an ascending order.

13. The computer program product of claim 11, wherein mapping the active data further comprises:
for the block addresses for the active data of the source virtual tape, updating the disk block to host block mapping table to add new block addresses of the target virtual tape.

14. The computer program product of claim 11, further comprising:
removing the block addresses for the active data of the source virtual tape from the disk block to host block mapping table to free up space in the virtual tape library system.

15. The computer program product of claim 11, further comprising:
updating the disk block to host block mapping table by assigning the block addresses for the active data of the source virtual tape to new block addresses of the target virtual tape starting at the last written block address on the target virtual tape and deleting the block addresses for the active data for the source virtual tape.

16. An electronic data processing system for managing virtual tapes in a virtual tape library system, comprising:
a processor; and
memory elements coupled to the processor, wherein the memory elements store program code, and the program code is executed to perform operations, wherein the operations comprise:
mapping each host block written by a storage management application to a respective disk block on a disk system of the virtual tape library system in a disk block to host block mapping table that identifies, for each disk block, a host block address and a source virtual tape identifier;
determining that the source virtual tape requires reclamation;
identifying block addresses for active data of the source virtual tape;
identifying a target virtual tape that has capacity to store the active data of the source virtual tape;
identifying a last written block address on the target virtual tape; and
mapping the active data of the source virtual tape to the target virtual tape starting at the last written block address on the target virtual tape by updating the disk block to host block mapping table to replace, for each of the block addresses for active data, 1) the host block address on the source virtual tape with a host block address on the target virtual tape and 2) the source virtual tape identifier with a target virtual tape identifier.

17. The electronic data processing system of claim 16, further comprising:
sorting the block addresses for the active data of the source virtual tape in an ascending order.

18. The electronic data processing system of claim 16, wherein mapping the active data further comprises:
for the block addresses for the active data of the source virtual tape, updating the disk block to host block mapping table to add new block addresses of the target virtual tape.

19. The electronic data processing system of claim 16, further comprising:
removing the block addresses for the active data of the source virtual tape from the disk block to host block mapping table to free up space in the virtual tape library system.

20. The electronic data processing system of claim 16, further comprising:

updating the disk block to host block mapping table by assigning the block addresses for the active data of the source virtual tape to new block addresses of the target virtual tape starting at the last written block address on the target virtual tape and deleting the block addresses for the active data for the source virtual tape.

\* \* \* \* \*